US008004751B2

(12) United States Patent
Onaka et al.

(10) Patent No.: US 8,004,751 B2
(45) Date of Patent: Aug. 23, 2011

(54) WAVELENGTH DIVISION MULTIPLEXING OPTICAL TRANSMISSION SYSTEM UTILIZING DISTRIBUTED RAMAN AMPLIFICATION (75) Inventors: Miki Onaka, Kawasaki (JP); Kiyotoshi Noheji, Kawasaki (JP); Togo Fukushi, Kawasaki (JP); Masanori Kondoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 12/232,900

(22) Filed: Sep. 25, 2008

(65) Prior Publication Data
US 2009/0190204 A1   Jul. 30, 2009

(30) Foreign Application Priority Data

Jan. 25, 2008   (JP) .................................. 2008-014935

(51) Int. Cl.
*H04B 10/17* (2006.01)
*H04B 10/08* (2006.01)
*H04B 10/12* (2006.01)

(52) U.S. Cl. ............... 359/334; 398/18; 398/28; 398/34
(58) Field of Classification Search .................. 359/334; 398/18, 28, 34
See application file for complete search history.

(56) References Cited

U.S. PATENT DOCUMENTS

| | | | |
|---|---|---|---|
| 6,433,922 B1 * | 8/2002 | Ghera et al. ................... | 359/334 |
| 6,510,000 B1 | 1/2003 | Onaka et al. | |
| 6,519,082 B2 * | 2/2003 | Ghera et al. ............... | 359/341.4 |
| 6,785,042 B1 | 8/2004 | Onaka et al. | |
| 6,839,160 B2 * | 1/2005 | Tsuda et al. .................. | 359/337 |
| 7,068,421 B2 | 6/2006 | Tokura et al. | |
| 7,139,120 B2 * | 11/2006 | Sugiya ..................... | 359/341.42 |
| 2002/0159134 A1 * | 10/2002 | Ghera et al. .................. | 359/334 |
| 2004/0136053 A1 * | 7/2004 | Sugiya ....................... | 359/337.1 |
| 2005/0024712 A1 | 2/2005 | Hiraizumi et al. | |
| 2005/0099676 A1 | 5/2005 | Tokura et al. | |

FOREIGN PATENT DOCUMENTS

| | | |
|---|---|---|
| JP | 2001-007768 | 1/2001 |
| JP | 2002-076482 | 3/2002 |
| JP | 2004-158652 | 6/2004 |
| JP | 2004-193640 | 7/2004 |
| JP | 2006-189465 | 7/2006 |

OTHER PUBLICATIONS

Japanese Office Action mailed Nov. 10, 2009 corresponding to Japanese Application No. 2008-014935 (3 pages) (English translation 5 pages).

* cited by examiner

*Primary Examiner* — Eric Bolda
(74) *Attorney, Agent, or Firm* — Staas & Halsey LLP (57) ABSTRACT The WDM optical transmission system using distributed Raman amplification, before starting operation of main signal light, transfers a plurality of lights having different wavelengths to that of the main signal light (for example Raman amplification pump lights or the like) between first and second optical transmission devices connected to opposite ends of a transmission line, monitors transmission line input and output power for each light, calculates a transmission line loss in each wavelength using the monitor results, and specifies a type of the transmission line based on a loss wavelength characteristic that can be estimated from the calculation result. Then the power of pump light provided to the transmission light is optimized in accordance with the type of transmission line.

18 Claims, 7 Drawing Sheets

RELATED ART

FIG.10

RELATED ART

WAVELENGTH DIVISION MULTIPLEXING OPTICAL TRANSMISSION SYSTEM UTILIZING DISTRIBUTED RAMAN AMPLIFICATION

CROSS-REFERENCE TO RELATED APPLICATION

This application is based upon and claims the benefit of priority of the prior Japanese Patent Application No. 2008-014935, filed on Jan. 25, 2008, the entire contents of which are incorporated herein by reference.

FIELD

The present invention relates to an optical transmission system that transfers wavelength division multiplexing (WDM) signal light via a transmission line, and in particular relates to a WDM optical transmission system having a function of providing pump light to the transmission line to perform distributed Raman amplification on the WDM signal light.

BACKGROUND

Under a background of recent increases in communication traffic, the demand for optical communication transmission apparatuses is increasing. Introduction of optical communication transmission apparatuses has been vigorously carried out recently not only for optical repeating nodes introduced in backbone networks but also for local networks, and optical networks have been formed also for subscriber loops. Thus, the optical transmission system plays an important role with respect to world information networks.

In such an optical transmission system, a WDM optical amplifier repeater transmission system which can realize large-capacity and long-distance transmission while ensuring high reliability at a low cost, for example, by providing a WDM optical amplifier such as an erbium doped fiber amplifier (EDFA) for each repeater section (span) on the transmission line, becomes mainstream.

In the above-described WDM optical transmission system, under conditions such as where a transfer loss increases due to factors such as a long transmission line, the input level of the signal light to the optical amplifier decreases. Therefore, an optical signal-to-noise ratio (OSNR) indicating a ratio between signal light power and noise light power may deteriorate, to thereby deteriorate transmission characteristics of the WDM signal light. As one method of avoiding this, application of distributed Raman amplification (DRA) technology is effective, in which pump light is injected to the transmission line, to enable compensation of the transfer loss by utilizing amplification due to the effect of stimulated Raman scattering. In a system using distributed Raman amplification, since the level of the signal light that has propagated through the transmission line and been input to the optical amplifier such as the EDFA increases, the OSNR increases to improve the transmission characteristics, thereby increasing the number of repeater spans that can transmit the WDM signal light. Accordingly, the distributed Raman amplifier has already been put to practical use as an effective means for realizing long-distance transmission.

Figure 9:
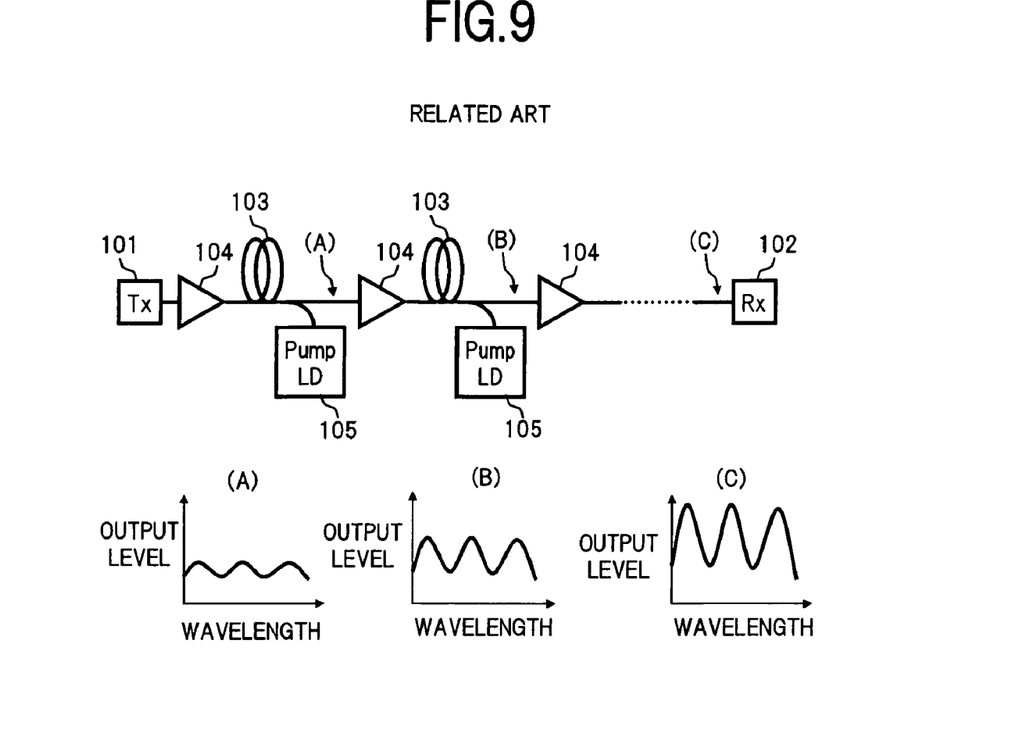
FIG. 9 is a diagram showing one example of a WDM optical transmission system that uses general distributed Raman amplification.

FIG. 9 is one example of a WDM optical transmission system that uses general distributed Raman amplification. Here a transmission section (Tx) 101 and a reception section (Rx) 102 are connected via a transmission line 103, and optical amplifiers 104 such as EDFAs are arranged at required intervals on the transmission line 103. Moreover Raman pump light sources (PumpLD) 105 are provided for injecting pump light into the transmission line 103 in each repeater section. According to such a system configuration, the WDM signal light is subjected to distributed Raman amplification on the transmission line 103 in each repeater section by the pump light from each Raman pump light source 105, to compensate for the loss, thereby improving the transmission characteristics of the WDM signal light that reaches the reception section 102.

Incidentally, in the distributed Raman amplification, it is known that a wavelength characteristic is generated in the output light level after amplification due to wavelength dependence of Raman gain. Regarding output wavelength characteristics in the distributed Raman amplification, in the WDM optical transmission system as illustrated in FIG. 9, level deviation between wavelengths is accumulated while being enlarged by the optical amplifier 104 (in-line amplifier) in each repeater section. Therefore, as schematically illustrated in the lower parts (A) to (C) of FIG. 9, level deviation between wavelengths in the reception section 102 may increase considerably, thereby causing a problem of deterioration of the transmission characteristics (for example, occurrence of a nonlinear phenomenon, OSNR deterioration, and exceeding an input range of a receiver).

Figure 10:
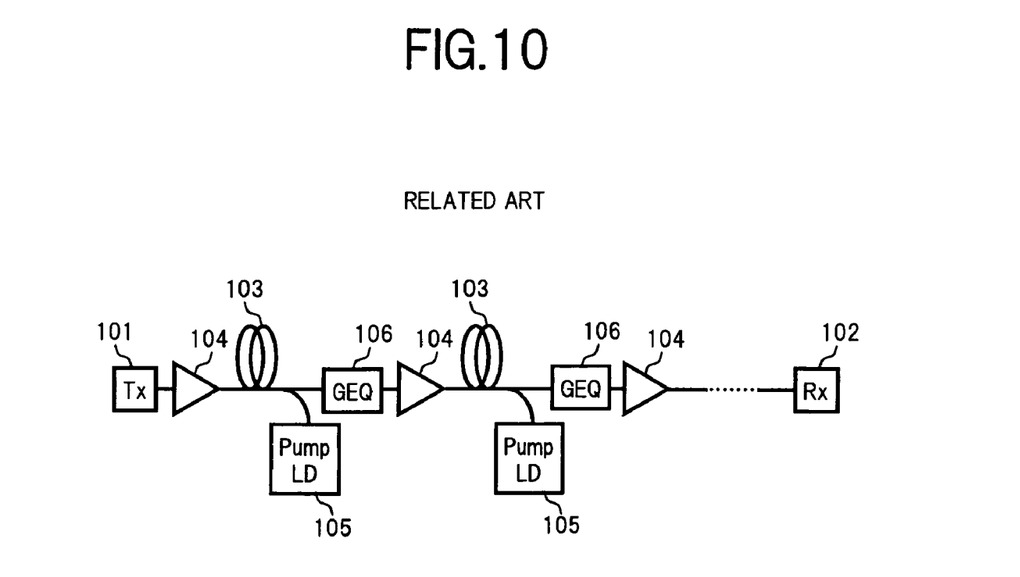
FIG. 10 is a diagram showing one example in which an optical filter corresponding to a gain wavelength characteristic of distributed Raman amplification is provided in the system of FIG. 9.

In order to suppress deterioration of the transmission characteristics attributable to the gain wavelength characteristics of the distributed Raman amplification as described above, for example in Japanese Laid-open Patent Publication No. 2002-76482, as illustrated in FIG. 10, there is proposed a technique for compensating the wavelength characteristic of the WDM signal light after distributed Raman amplification by inserting an optical filter (GEQ) 106 having a fixed loss wavelength characteristic corresponding to the gain wavelength characteristic of the distributed Raman amplification, in each repeater section.

However, the output wavelength characteristics of WDM signal light after being subjected to distributed Raman amplification change according to system requirements such as the type of the transmission line, the number of wavelengths of the WDM signal light, and the setting of Raman gain. Therefore, a deviated portion between the fixed loss wavelength characteristics of each optical filter 106 and the output wavelength characteristics to be compensated by the respective optical filters 106 becomes a residual wavelength characteristic, and this accumulates through an optical amplifier repeater such as an in-line amplifier, causing a deterioration in the transmission characteristics, which is a problem.

Here the reason why the output wavelength characteristics change according to the system requirements will be explained briefly. In the transmission line, the loss wavelength characteristics are different because their compositions (materials) are different according to their type, and the output wavelength characteristics of the light that has been subjected to distributed Raman amplification on the transmission line serving as an amplification medium, also change according to the type of the transmission line. Moreover, when the WDM signal light enters into the transmission line, the signal light power on the long wavelength side increases due to the Raman effect, which is a physical phenomenon in which the power is transferred from the short wavelength side to the long wavelength side, and a tilt occurs in the output wavelength characteristics of the WDM signal light that has propagated through the transmission line. According to the above described Raman effect, the power shifting from the short wavelength side to the long wavelength side increases, as the number of wavelengths of the WDM signal light increases. Therefore, a large tilt occurs in the output wavelength characteristics of the transmission light. Moreover, since the efficiency of the Raman effect also changes because the effective core area is different according to the type of the transmission line, the size of the tilt due to the Raman effect also becomes different according to the type of the transmission line.

As a conventional technique that can reduce the aforementioned deterioration of the transmission characteristics due to the change of the system requirements, for example, in Japanese Laid-open Patent Publication No. 2001-7768 and Japanese Laid-open Patent Publication No. 2002-76482, a technique is proposed where the wavelength characteristics of the WDM signal light that has been subjected to distributed Raman amplification are monitored by using an optical spectrum analyzer or the like, and the power of the Raman amplification pump light having a plurality of wavelengths is adjusted so that the output wavelength characteristics decrease.

For example, in Japanese Laid-open Patent Publication No. 2006-189465 there is proposed a technique in which design value information relating to a pump light power ratio capable of canceling the residual wavelength characteristics which occur according to the system requirements, is stored in a database beforehand, and a design value having a pump light power ratio matched with the actual system requirements is extracted from the database and brought into a control operation.

However, in the above described conventional technique in which the output wavelength characteristics are monitored to adjust the pump light power, it is necessary to provide an expensive monitor device such as an optical spectrum analyzer, making the configuration complicated. Therefore there are problems such as an increase in apparatus cost, and problems with installation space. Moreover, since very complicated control is also required for adjusting the pump light power of each wavelength according to the monitored output wavelength characteristics, there is also a problem in practicability thereof.

Furthermore regarding the conventional technique in which the design value information of the pump light power ratio corresponding to the system requirements is stored in the database, a huge amount of data corresponding to various system requirements needs to be held in order to realize highly accurate control. For example, it is necessary to segmentalize transmission line loss (span loss) according to the required accuracy, and set the pump light power ratio corresponding to conditions such as the number of signal wavelengths and the Raman gain for each span loss, and then store this in the database. However, it is not easy to build up such a huge database, and even if it can be realized, a process for selecting a design value suitable for the actual system requirements from the database is required, thereby causing a problem in the control speed. That is to say, it is a problem how to specify a favorable pump light power ratio by using the requisite minimum database.

SUMMARY

The present invention focuses attention on the above points, with an object of being able to, in a WDM optical transmission system using distributed Raman amplification, reduce deterioration of the transmission characteristics attributable to differences in the types of transmission lines and the like, with a simple configuration and easy control.

In order to achieve the above object, one aspect of the WDM optical transmission system has a system configuration provided with a first optical transmission device connected to one end of a transmission line, for transmitting WDM signal light to the transmission line, and a second optical transmission device connected to an other end of the transmission line for receiving WDM signal light that has propagated through the transmission line and been subjected to distributed Raman amplification. The WDM optical transmission system comprises: a monitoring device that transfers a plurality of lights having different wavelengths to that of the WDM signal light, between the first and the second optical transmission devices via the transmission line, before starting operation of WDM signal light, and monitors transmission line input power and transmission line output power, respectively, for the plurality of lights; a computing device that calculates a transmission line loss in each wavelength corresponding to the plurality of lights, by using values of transmission line input power and transmission line output power for the plurality of lights monitored by the monitoring device, and specifies a type of the transmission line based on a loss wavelength characteristic that can be estimated from the calculation result; a pump light supply device that supplies to the transmission line, pump light for performing distributed Raman amplification on the WDM signal light propagating through the transmission line; and a control device that controls the pump light supply device so that an output wavelength characteristic of WDM signal light that has been subjected to distributed Raman amplification, and which is output from an other end of the transmission line, becomes a target output wavelength characteristic, corresponding to the type of the transmission line specified by the computing device.

In this WDM optical transmission system, the plurality of lights having different wavelength to that of the WDM signal light are transferred between the first and the second optical transmission devices before starting operation of the WDM signal light, and after the transmission line input and output powers of the respective lights have been monitored by the monitoring device, a transmission line loss in each wavelength is calculated by the computing device by using the monitored value. Furthermore by estimating the loss wavelength characteristic of the transmission line from the calculation result, the type of the transmission line is specified. Then according to the specified type of the transmission line, optimization of the pump light to be provided from the pump light supply device to the transmission line is performed by the pump light control device.

According to the above WDM optical transmission system, the type of the transmission line actually connected to between the first and the second optical transmission devices can be specified by a simple monitor configuration and arithmetic processing, and the output wavelength characteristic of the WDM signal light after being subjected to the distributed Raman amplification can be set to the target output wavelength characteristic, automatically corresponding to the type of the transmission line. Therefore, deterioration of the transmission characteristics attributable to the difference in the type of the transmission lines can be easily reduced.

Other objects, features, and advantages of the present invention will become apparent from the following description of embodiments, in conjunction with the appended drawings.

DESCRIPTION OF EMBODIMENTS

Hereunder is a description of a best mode for carrying out the present invention, with reference to the accompanying drawings. Throughout the figures, the same reference symbols denote the same or corresponding parts.

Figure 1:
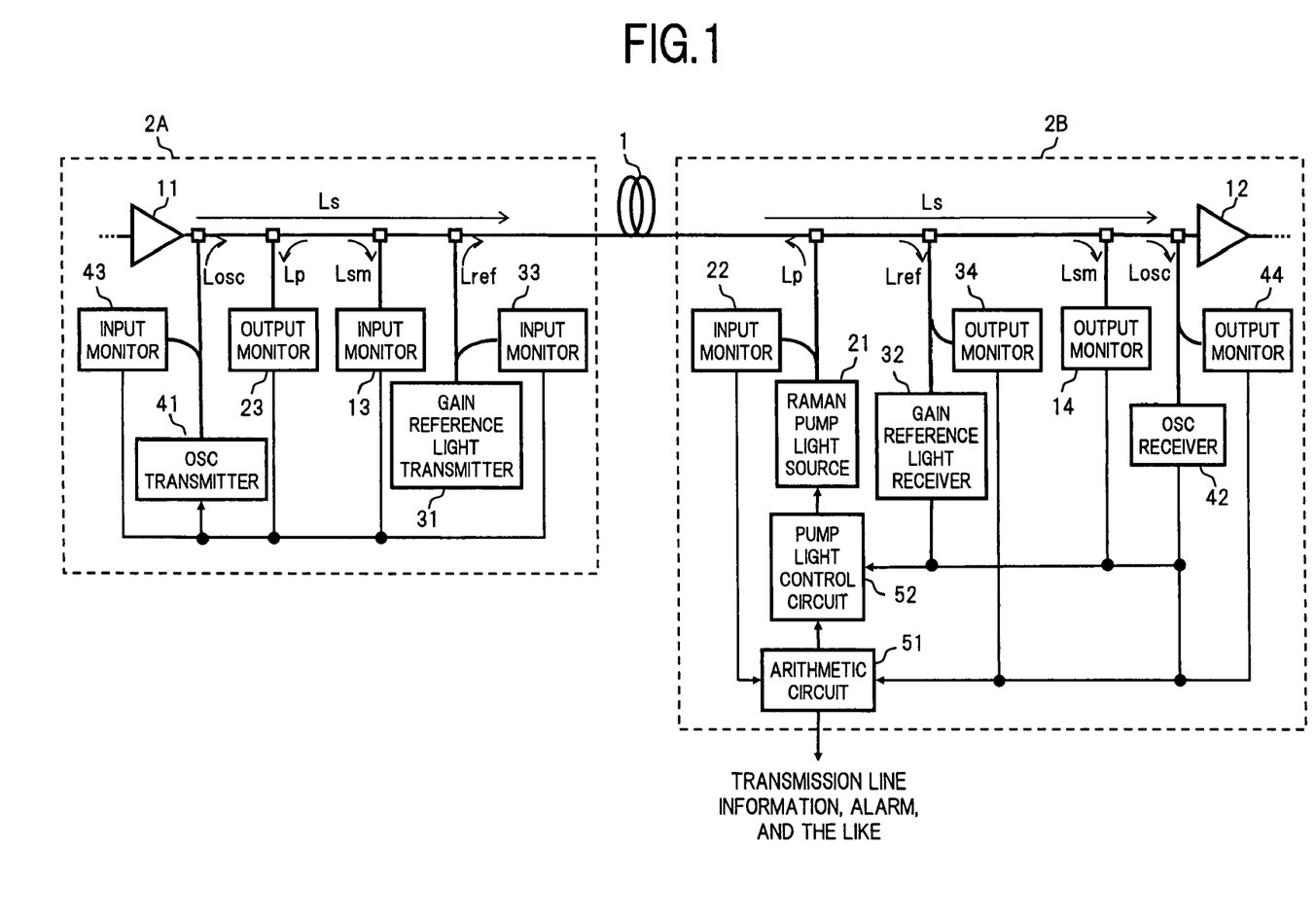
FIG. 1 is a block diagram showing a configuration of one repeater section in one embodiment of the WDM optical transmission system.

FIG. 1 is a block diagram showing a configuration of one repeater section in one embodiment of a WDM optical transmission system using distributed Raman amplification according to the present invention.

In FIG. 1, optical transmission devices 2A and 2B connected to opposite ends of a transmission line 1 are provided as one component of a terminal station or a repeater station of the WDM optical transmission system as illustrated for example in FIG. 10. Here, a configuration of a main part of the first optical transmission device 2A connected to a transmission end of the transmission line 1, and a configuration of a main part of the second optical transmission device 2B connected to a reception end of the transmission line 1 are illustrated in FIG. 1 for one repeater section. It is assumed here that the same apparatus configuration as in FIG. 1 is applied to other repeater sections of the WDM optical transmission system.

Specifically, the optical transmission device 2A on the transmission side is provided for example with; an optical amplifier 11, a main signal light input monitor 13, a pump light output monitor 23, a gain reference light transmitter 31, a gain reference light input monitor 33, an optical supervisory channel (OSC) transmitter 41, and an OSC input monitor 43. Moreover, the optical transmission device 2B on the reception side is provided for example with; an optical amplifier 12, a main signal light output monitor 14, a Raman pump light source 21, a pump light input monitor 22, a gain reference light receiver 32, a gain reference light output monitor 34, an OSC receiver 42, an OSC output monitor 44, an arithmetic circuit 51, and a pump light control circuit 52.

For the transmission line 1 connecting between the respective optical transmission devices 2A and 2B, various optical fibers (for example, a 1.3 μm zero-dispersion single mode fiber (SMF) and a dispersion shifted fiber (DSF)) used for optical communication can be applied. As described later, if the type of the optical fiber applied to the transmission line 1 is different, the transmission line 1 has a different loss wavelength characteristic corresponding to the type.

The optical amplifiers 11 and 12 in the respective optical transmission devices 2A and 2B are in-line amplifiers that amplify the WDM signal light (hereinafter referred to as "main signal light") Ls in which a plurality of optical signals having different wavelengths are wavelength-multiplexed, to a desired level. Here a case in which, for example, a C-band (1530 to 1565 nm) is set as a wavelength band of the main signal light Ls is assumed. For the optical amplifiers 11 and 12 corresponding to the C-band main signal light Ls, a known optical amplifier such as an EDFA can be used. The wavelength band of the main signal light in the present invention is not limited to the above C-band, and the present invention is also effective for known signal wavelength bands other than the C-band, and an optical amplifier corresponding to the signal wavelength band can be appropriately used to realize the optical amplifiers 11 and 12.

The main signal light Ls output from the aforementioned optical amplifier 11 is input to the transmission end of the transmission line 1, and a part thereof is branched as a monitor light Lsm and provided to the main signal light input monitor 13. The main signal light input monitor 13 monitors the power of the main signal light Ls input to the transmission line 1 by measuring the power of the monitor light Lsm, and outputs a monitoring result to the OSC transmitter 41. The main signal light output monitor 14 provided in the optical transmission device 2B on the reception side monitors the power of the main signal light Ls output from the transmission line 1 by branching a part of the main signal light Ls output from the reception end of the transmission line 1 and transmitted to the optical amplifier 12 as the monitor light Lsm, and measuring the power thereof. When light other than the monitor light Lsm of the main signal (OSC light or gain reference light described later) is included in the light provided to the aforementioned main signal light input monitor 13 or the main signal light output monitor 14, an optical filter having a transmission band corresponding to the wavelength band of the main signal light Ls can be inserted into a previous stage of the monitor, so that unnecessary light is not input to the monitor.

The main signal light input monitor 13 and the main signal light output monitor 14 are not directly used for the measurement of transmission line loss described later. However, these monitors are required for gain control or output control of the Raman amplifier, and hence reference is made here.

The Raman pump light source 21 provided in the optical transmission device 2B on the reception side can generate a plurality of pump lights having different wavelengths, and supplies light obtained by multiplexing the respective pump lights (hereinafter referred to as "pump light Lp") to the transmission line 1 from the reception end. The wavelengths of the respective pump lights are predetermined according to the wavelength band of the main signal light Ls, and the power ratio and the total power of the respective pump lights are controlled by the pump light control circuit 52 according to system requirements described later. Explanation below is given, assuming that the pump light Lp has a wavelength of 1430 nm. The pump light input monitor 22 monitors the power of the pump light Lp input to the transmission line 1, by branching a part of the pump light Lp output from the Raman pump light source 21, and measuring the power thereof, and outputs the monitoring result to the arithmetic circuit 51. The pump light output monitor 23 provided in the optical transmission device 2A on the transmission side extracts the pump light Lp that is input to the transmission line 1 from the reception end, propagates in an opposite direction to the main signal light Ls and is output from the transmission side, monitors the power thereof, and outputs the monitoring result to the OSC transmitter 41.

Figure 2:
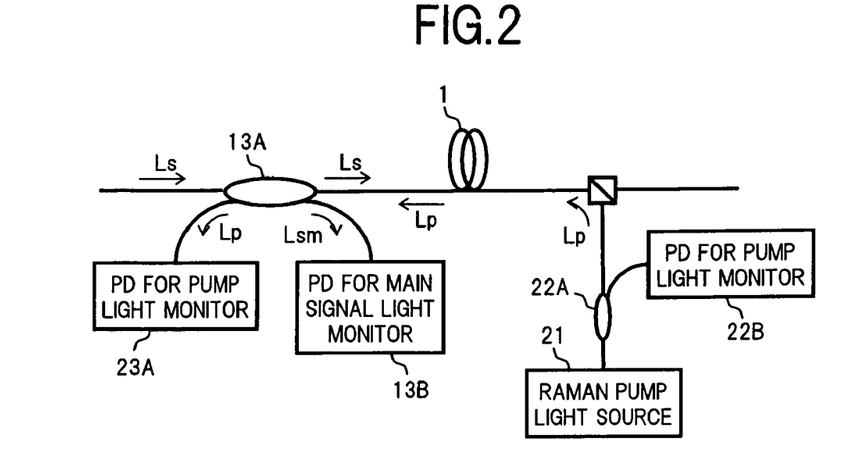
FIG. 2 is a diagram showing a specific configuration example of a pump light input monitor and a pump light output monitor in FIG. 1.

FIG. 2 is a diagram showing a specific configuration example of the aforementioned pump light input monitor 22 and the pump light output monitor 23. In the configuration example of FIG. 2, a branching coupler 22A is inserted into an output end of the Raman pump light source 21, and a PD 22B for monitoring the pump light is connected to a branching port of the branching coupler 22A, to thereby form the pump light input monitor 22. On the other hand, for the pump light output monitor 23, by using a branching coupler 13A, which is a component of the main signal light input monitor 13 provided in the optical transmission device 2A on the transmission side, and connecting a PD 23A for monitoring the pump light to an unused port of the branching coupler 13A, an output power of the pump light Lp propagating in the opposite direction to the main signal light Ls is monitored. That is to say, the branching coupler 13A has two-to-two ports in a fiber type configuration, in which the main signal light Ls is input from a port located upper left in FIG. 2, and the main signal light Ls is branched into two at a required branching ratio, with one being output from an upper right port to the transmission line 1 and the other being output from a lower right port to a PD 13B for monitoring the main signal light. Moreover the pump light Lp that has propagated through the transmission line 1 in the opposite direction to the main signal light Ls is input from an upper right port of the branching coupler 13A, and a part thereof is output from a lower left port to the PD 23A for monitoring the pump light. At this time, the light output from the lower left port of the branching coupler 13A, to which the PD 23A for monitoring the pump light is connected, also includes leaked light of the main signal light Ls input to the upper left port. However since, as a general characteristic of the branching coupler, the power of the leaked light is negligible (for example, directivity is 40 dB), the optical power in the opposite direction separated from the main signal light Ls can be monitored by the PD 23A for monitoring the pump light.

Figure 3:
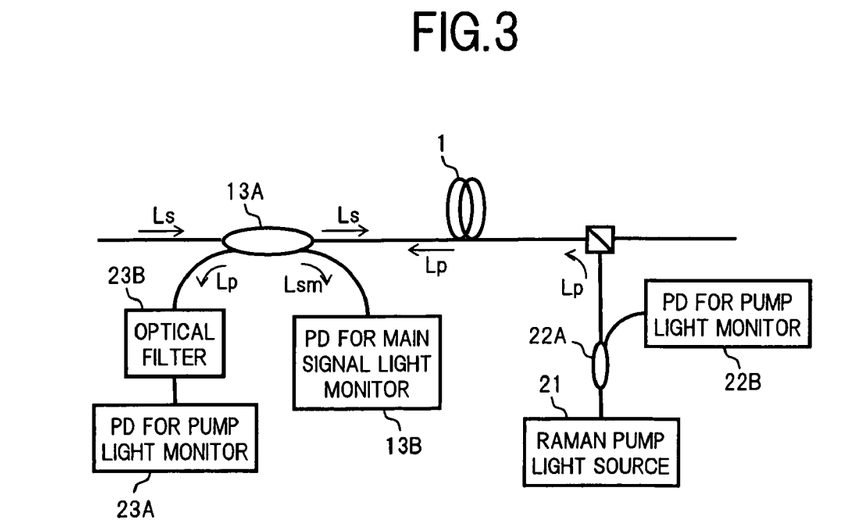
FIG. 3 is a diagram showing another specific configuration example of a pump light input monitor and a pump light output monitor in FIG. 1.
Figure 4:
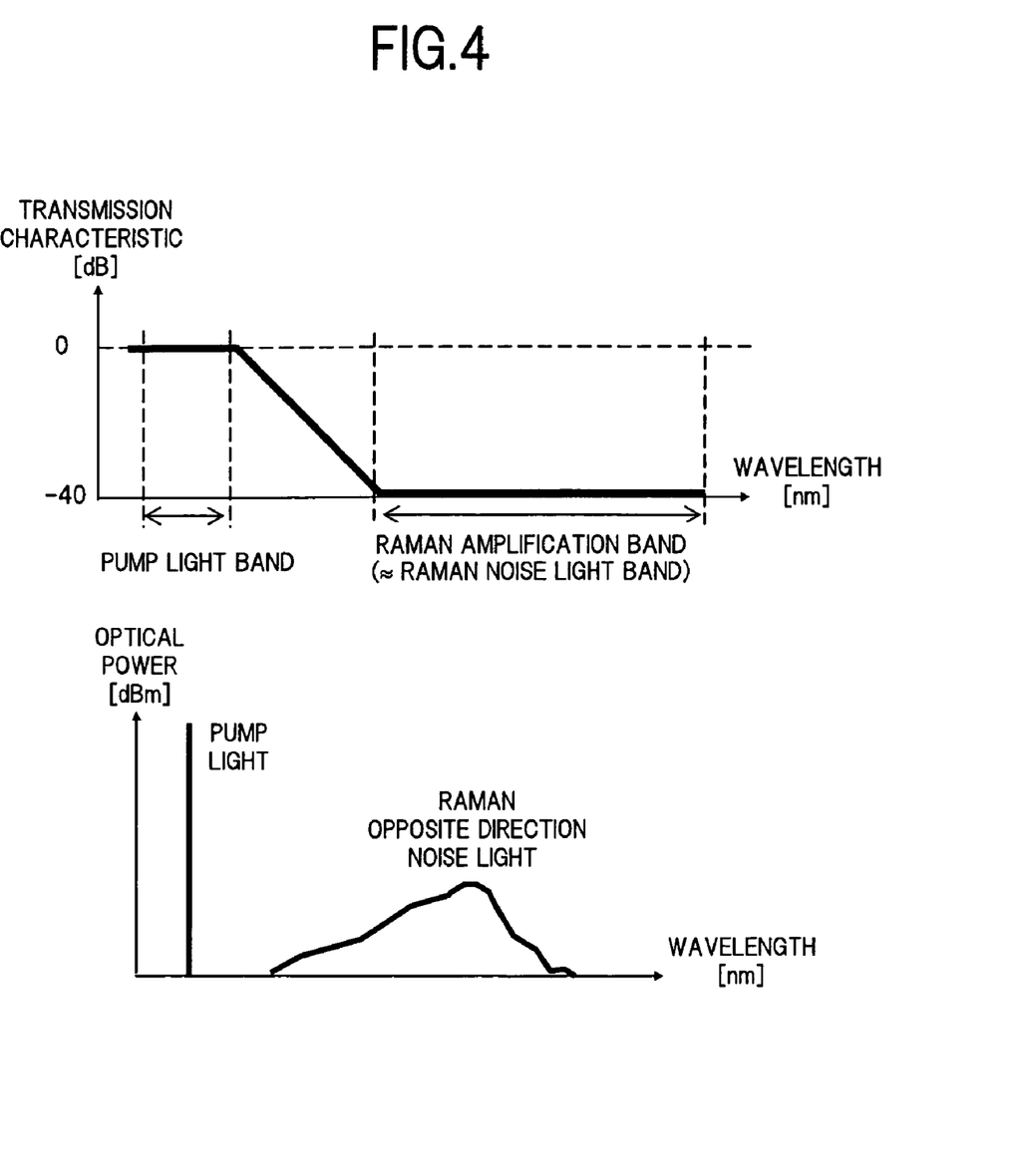
FIG. 4 is a diagram showing a transmission wavelength characteristic of the optical filter in FIG. 3, and a generation band of Raman opposite direction noise light with respect to pump light wavelength.

However, when the power of the component of the noise light generated at the time of Raman amplification in the transmission line 1 and propagating in the opposite direction to the main signal light (Raman opposite direction noise light) is large, the Raman opposite direction noise light may also be input to the PD 23A for monitoring the pump light via the branching coupler 13A, and causes a monitoring error. In this case, for example as illustrated in FIG. 3, it is preferable to insert an optical filter 23B between the branching coupler 13A and the PD 23A for monitoring the pump light, to remove the Raman opposite direction noise light by the optical filter 23B. The upper part of FIG. 4 shows one example of a transmission wavelength characteristic of the optical filter 23B, and the lower part schematically shows a generation band of Raman opposite direction noise light with respect to pump light wavelength.

The gain reference light transmitter 31 provided in the optical transmission device 2A (FIG. 1) on the transmission side generates a light having a required power in which the wavelength is set outside of the wavelength band of the main signal light Ls, as a gain reference light Lref for performing gain constant control by detecting a gain of the distributed Raman amplification in the transmission line 1, and provides the gain reference light Lref to the transmission line 1 from the transmission end. Moreover, the gain reference light receiver 32 provided in the optical transmission device 2B on the reception side receives the gain reference light Lref that has propagated through the transmission line 1, detects a Raman gain on the transmission line 1 based on the level of the gain reference light Lref, and outputs a detection result to the pump light control circuit 52. The above technique for performing constant control of the Raman gain by using the gain reference light is described for example in Japanese Laid-open Patent Publication No. 2004-193640, and in Japanese Patent Application No. 2007-321775 which is a prior application filed by the present applicant, and this technique is used in the present invention. Here for example, 1610 nm positioned outside the band on the long wavelength side of the C-band is assumed as the wavelength of the gain reference light Lref. However the wavelength of the gain reference light Lref in the present invention is not limited to this example.

The gain reference light input monitor 33 arranged on a subsequent stage of the gain reference light transmitter 31 branches a part of the gain reference light Lref output from the gain reference light transmitter 31 and measures the power thereof, to thereby monitor the power of the gain reference light Lref input to the transmission line 1, and outputs the monitoring result to the OSC transmitter 41. Moreover, the gain reference light output monitor 34 arranged on a previous stage of the gain reference light receiver 32 branches a part of the gain reference light Lref received by the gain reference light receiver 32 and measures the power thereof, to thereby monitor the power of the gain reference light Lref output from the transmission line 1, and outputs the monitoring result to the arithmetic circuit 51.

Here, the gain reference light output monitor 34 is provided separately from the gain reference light receiver 32 so as to monitor the output power of the gain reference light Lref. However, if the gain reference light receiver 32 can output the output power of the gain reference light Lref monitored at the time of detecting the Raman gain, to the outside, then by providing the output to the arithmetic circuit 51, the gain reference light output monitor 34 can be omitted.

The OSC transmitter 41 provided in the optical transmission device 2A on the transmission side is for generating an OSC light Losc for transmitting operation information of the system to a repeater station or a terminal station on the downstream side, and providing the OSC light Losc to the transmission line 1 from the transmission end. The OSC light Losc includes monitoring results of the pump light output monitor 23, the gain reference light input monitor 33, and the OSC input monitor 43, in addition to the general system operation information such as the number of wavelengths of the main signal light Ls and the transmission power of the main signal light Ls to the transmission line 1. Moreover the OSC receiver 42 provided in the optical transmission device 2B on the reception side is for receiving the OSC light Losc that has propagated through the transmission line 1, outputting the system operation information included in the OSC light Losc to the pump light control circuit 52, and outputting the monitoring results of the pump light output monitor 23, the gain reference light input monitor 33, and the OSC input monitor 43 to the arithmetic circuit 51. Here for example, 1510 nm positioned outside the band on the short wavelength side of the C-band and more on the long wavelength side than the wavelength band of the pump light Lp is assumed as the wavelength of the OSC light Losc. However, the wavelength of the OSC light Losc in the present invention is not limited to this example.

The OSC input monitor 43 arranged on the subsequent stage of the OSC transmitter 41 branches a part of the OSC light Losc output from the OSC transmitter 41 and measures the power thereof, to thereby monitor the power of the OSC light Losc input to the transmission line 1, and outputs the monitoring result to the OSC transmitter 41. Moreover the OSC output monitor 44 arranged on the previous stage of the OSC receiver 42 branches a part of the OSC light Losc received by the OSC receiver 42 and measures the power thereof, to thereby monitor the power of the OSC light Losc output from the transmission line 1, and outputs the monitoring result to the arithmetic circuit 51.

The arithmetic circuit 51 uses the monitoring results of the pump light input monitor 22 and output monitor 23, the monitoring results of the gain reference light input monitor 33 and output monitor 34, and the monitoring results of the OSC input monitor 43 and output monitor 44, to obtain a loss of the transmission line 1 in each wavelength of the pump light Lp, the gain reference light Lref, and the OSC light Losc, respectively by calculation. The arithmetic circuit 51 then calculates the loss wavelength characteristic of the transmission line 1 according to the obtained transmission line loss in each wavelength, and specifies the type of the transmission line 1 based on the loss wavelength characteristic, and outputs the result thereof to the pump light control circuit 52.

The pump light control circuit 52 controls the supply conditions of the pump light Lp for Raman amplification so that the output wavelength characteristic of the main signal light Ls after Raman amplification output from the transmission line 1 substantially coincides with a preset target output wavelength characteristic, based on the type of the transmission line 1 specified by the arithmetic circuit 51, the system operation information obtained by the OSC receiver 42, and the Raman gain detected by the gain reference light receiver 32.

Next is a description of the operation of the embodiment.

In the WDM optical transmission system having the above described configuration, the pump light Lp, the gain reference light Lref, and the OSC light Losc are respectively input to the transmission line before starting operation of the main signal light Ls such as at the time of startup of the system, that is, in a state where the main signal light Ls is not input to the transmission line 1 in each repeater section. Then the powers of the respective lights at the time of being input to the transmission line and the powers at the time of being output from the transmission line after propagating through the transmission line 1 are monitored, and the respective monitoring results are transmitted to the arithmetic circuit 51 in the optical transmission device 2B on the reception side directly or via the OSC light. In the arithmetic circuit 51, the transmission line losses of the pump light Lp, the gain reference light Lref, and the OSC light Losc are respectively calculated by using the transmitted monitoring results, according to the relationship in the following equation (1).

$$\text{Transmission line loss [dB]} = \text{transmission line input power [dBm]} - \text{transmission line output power [dBm]} \quad (1)$$

Here, the reason why calculation of the transmission line loss is performed by using the pump light Lp, the gain reference light Lref, and the OSC light Losc is explained.

In the embodiment, the optical transmission devices 2A and 2B connected to the opposite ends of the transmission line 1 cooperate with each other to automatically recognize the type of the transmission line 1, which is the Raman amplification medium, to thereby optimize the pump light Lp for Raman amplification so that even if the system requirements change, the output wavelength characteristic of the main signal light Ls subjected to the distributed Raman amplification becomes the target output wavelength characteristic. The type of the transmission line used for optical communication is generally classified according to a value of dispersion, for example as with the 1.3 μm zero-dispersion single mode fiber (SMF) and the dispersion shifted fiber (DSF). The transmission line is made so that a desired dispersion characteristic can be obtained by changing the refractive index and the core diameter. The refractive index of the transmission line is characterized by the material to be added to the core and the clad, and it is known that the loss wavelength characteristic of the transmission line exhibits a unique shape according to the added material. (For example, "Optical fiber—Fiber optic device" written by Katsumi Morishita, published by Asakura Shoten, September 1993, p. 51 to 55). Therefore in the present invention, attention is paid to the loss wavelength characteristic of the transmission line, in order to realize a function of automatically recognizing the type of the transmission line.

Figure 5:
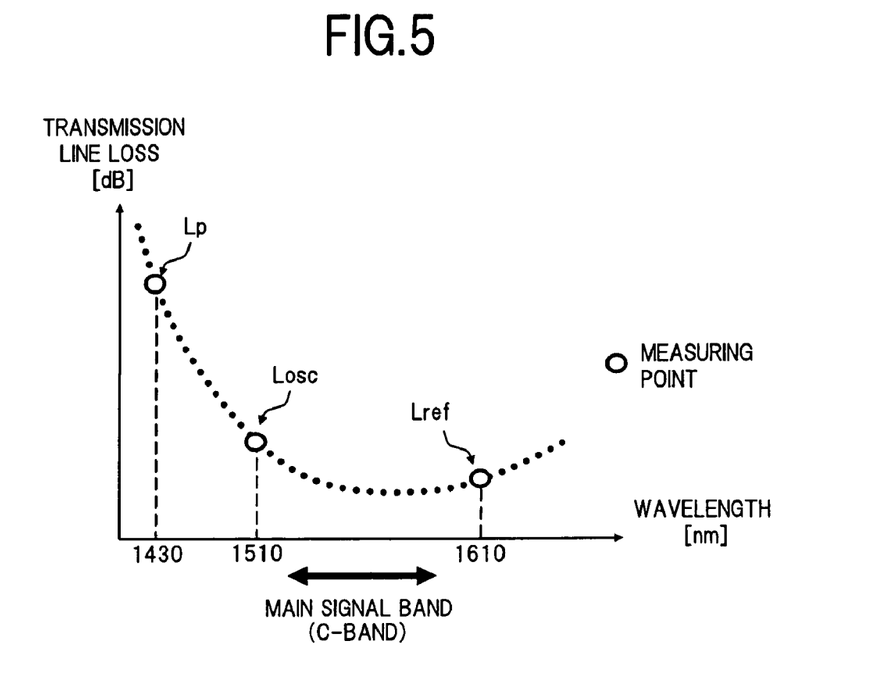
FIG. 5 is a diagram for explaining wavelength arrangement of pump light, gain reference light, and OSC light.

In order to accurately determine the loss wavelength characteristic of the transmission line, it is necessary to measure the transmission line loss by specifying a plurality of wavelengths for a wide wavelength range including the wavelength band of the main signal light Ls. The optical transmission device using the distributed Raman amplification conventionally has a configuration as illustrated in FIG. 5, in which the pump light Lp with the wavelength set to a position away from the main signal band (C-band) toward the short wavelength side by about 100 nm (here 1430 nm), the OSC light Losc having a wavelength of 1510 nm, being away from the pump light Lp toward the long wavelength side by 80 nm, and the gain reference light Lref having a wavelength of 1610 nm, being away from the OSC light Losc to the long wavelength side by 100 nm, putting the main signal band therebetween, can be output to the transmission line 1. Therefore by utilizing these lights, the loss wavelength characteristic of the transmission line 1 can be specified without adding a new light source or the like. That is to say, there is an advantage in that the apparatus configuration is not made complex for specifying the loss wavelength characteristic of the transmission line 1.

In the case where the OSC light Losc is used for measurement of the transmission line loss, the possibility is considered where the transmission line loss increases due to reasons such as a long transmission length of one repeater section or the like, and the level of the OSC light Losc reaching the OSC receiver 42 decreases, so that it is not possible to accurately monitor the output power of the OSC light Losc due to an influence of dark current or the like of the light receiving element in the OSC output monitor 44. In this case, by adding the pump light corresponding to the wavelength of the OSC light Losc so that the OSC light Losc also receives the Raman gain, the output power of the OSC light Losc can be monitored. At this time, the transmission line loss can also be calculated by ascertaining the Raman gain received by the OSC light Losc. However, since the noise light generated at the time of Raman-amplifying the OSC light Losc is received by the OSC output monitor 44 together with the OSC light, the transmission line loss may not be calculated accurately. To avoid this problem, for example, measurement of the input/output power and calculation of the transmission line loss can be performed according to a procedure described below.

Firstly, in a situation before starting the operation of the main signal light Ls, before starting up the OSC transmitter 41, the Raman pump light source 21 is activated to provide the pump light Lp to the transmission line 1, and only the noise light due to Raman amplification is received by the OSC output monitor 44 on the reception side to measure the power thereof. Here it is assumed that the measurement value of the noise light power is A [mW].

Subsequently, the OSC transmitter 41 is activated in a state with the pump light Lp being supplied to the transmission line 1, to provide the OSC light Losc to the transmission line 1, and the input/output powers of the OSC light Losc are measured by the OSC input monitor 43 and the OSC output monitor 44. Here it is assumed that the transmission line input power of the OSC light Losc is B[mW], the transmission line output power is C[mW], and the Raman gain received by the OSC light Losc is G[dB].

Then the transmission line loss in the wavelength of the OSC light is calculated by the arithmetic circuit 51 by using the above described measurement values according to the relationship in the following equation (2).

$$\text{Transmission line loss [dB]}=10*\log(B)\ [\text{dB}]-\{10*\log(C-A)-G\}[\text{dB}] \quad (2)$$

In the above explanation, an example in which the OSC light is Raman-amplified is illustrated. However, a device that increases the transmission line input power of the OSC light (for example, an optical amplifier for OSC described in Japanese Patent Application No. 2007-334945, which is a prior application filed by the present applicant) can also be used.

When the transmission line losses corresponding to each wavelength of the pump light Lp, the gain reference light Lref, and the OSC light Losc are calculated by the arithmetic circuit 51 in the above described manner, the loss wavelength characteristic of the transmission line 1 is obtained by using these values. Since the loss wavelength characteristic of the transmission line usually has a simple shape that can be approximated by a low order curve (second order or third order), if the transmission line loss in a specific wavelength of a requisite minimum number of the plurality of wavelengths can be obtained, the loss wavelength characteristic of the transmission line can be derived in a wide wavelength range based on the obtained transmission line loss. Therefore in the embodiment, the loss wavelength characteristic of the transmission line 1 is obtained by calculation according to an approximated curve by using the values of the transmission line loss in the three specific wavelengths of the pump light Lp, the gain reference light Lref, and the OSC light Losc. The order of the approximated curve is preferably third order, taking the calculation accuracy into consideration.

When the loss wavelength characteristic of the transmission line 1 is calculated in the arithmetic circuit 51, the type of the transmission line 1 is then specified. Here, for example, a judgement value or the like to be used for specifying the type of the transmission line is prestored in the database of a memory or the like (not illustrated), and the calculated loss wavelength characteristic is collated with the judgement value or the like in the database, to thereby specify the type of the transmission line. The database can be small, since the types of the transmission line used for the WDM optical transmission system are limited (there are only several types such as the aforementioned 1.3 µm zero-dispersion SMF and the DSF).

Figure 6:
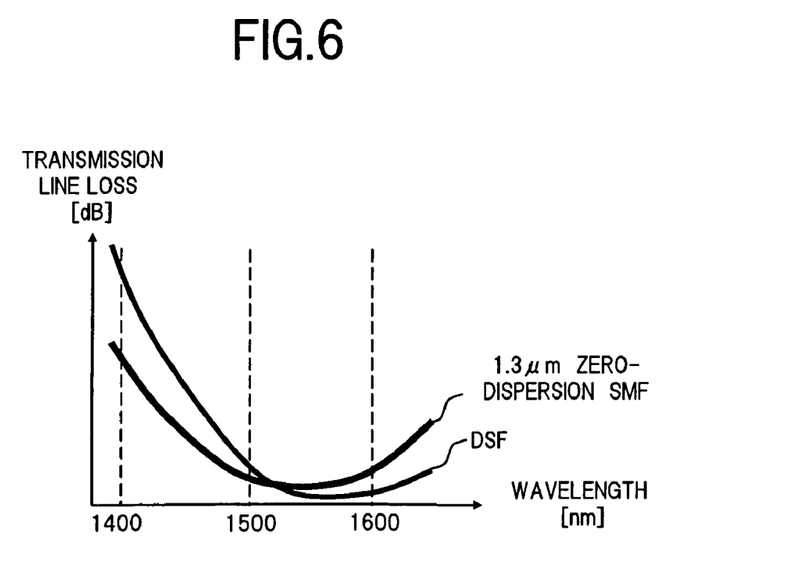
FIG. 6 is a diagram showing a difference in loss wavelength characteristics between 1.3 μm zero-dispersion SMF and DSF.

Specifically, if the case of discrimination between the 1.3 µm zero-dispersion SMF and the DSF is considered, then as illustrated in FIG. 6, with the transmission line loss in the main signal band or in an area on the long wavelength side thereof as a basis, the transmission line loss in an area more on the short wavelength side than the main signal band has a characteristic that this is larger for the DSF than for the 1.3 µm zero-dispersion SMF. Therefore, by determining the threshold by using this characteristic, the transmission line 1 can be specified as either of the 1.3 µm zero-dispersion SMF and the DSF.

When the type of the transmission line is specified according to such a concept for the case of the 1.3 µm zero-dispersion SMF and the DSF, the type of the transmission line can be specified by just monitoring the input optical power of at least two lights (for example, the pump light Lp and the gain reference light Lref) to calculate the transmission line loss. Specifically, the type of the transmission line can be specified by obtaining a ratio of the transmission line losses obtained for two lights or a difference [dB] between a transmission line loss of a reference light (for example, the gain reference light) and a transmission line loss of another light, and comparing it with a value for the ratio or difference of the transmission line loss prestored in the database for each type of the transmission line.

When the type of the transmission line 1 is specified in the arithmetic circuit 51 in the above manner, the information is transmitted to the pump light control circuit 52, and is also output to the outside of the optical transmission device 2B as transmission line information. To the pump light control circuit 52 are transmitted the system operation information from the OSC receiver 42 and a detection value of the Raman gain from the gain reference light receiver 32, in addition to the type of the transmission line from the arithmetic circuit 51. The pump light control circuit 52 controls the supply conditions of the pump light according to the system requirements by using these pieces of information. Details of the transmission line information output from the arithmetic circuit 51 to the outside will be described later.

In the pump light control circuit 52, for example, a power ratio (design value) of the pump light for Raman amplification of a plurality of wavelengths, predetermined according to the type of the transmission line and the number of wavelengths of the main signal light, is stored in the database of a memory or the like (not illustrated), and a pump light power ratio corresponding to the type of the transmission line 1 specified by the arithmetic circuit 51 and the number of wavelengths of the main signal light included in the system operation information from the OSC receiver 42 is selected from the database. Then the pump light power of each wavelength is optimized so that the total power of the pump light, in which a detection value of the Raman gain from the gain reference light receiver 32 becomes constant at a desired value, is realized, while maintaining the selected pump light power ratio.

Specifically, considering the case with two-wavelength excitation as one example, when the transmission line input power of pump light Lp1 having a wavelength $\lambda p1$ [nm] is expressed as P1 [mW], and the transmission line input power of pump light Lp2 having a wavelength $\lambda p2$ [nm] ($\lambda p1 < \lambda p2$) is expressed as P2 [mW], the pump light power ratio X (=P1/P2) is set as a fixed value according to the type of the transmission line and the number of wavelengths of the main signal light, and the transmission line input powers P1 and P2 of respective pump lights are adjusted so that the total power of the pump lights Lp1 and Lp2 (=P1+P2=X×P2+P2) becomes a value corresponding to the desired Raman gain. Table 1 below shows one example of the database for the pump light power ratio.

TABLE 1

| Number of wavelengths | Pump light power ratio | |
| --- | --- | --- |
| of main signal light | SMF | DSF |
| 25 or more | X1 | X4 |
| 10-24 | X2 | X5 |
| 9 or less | X3 | X6 |

Taking the type of the transmission line into consideration, the magnitude correlation of X1 to X6 in the above Table 1 is such that the transmission line loss on the short wavelength side is larger in the DSF than in the SMF, and hence the pump light power on the short wavelength side needs to be increased to give the relationship X1<X4, X2<X5, and X3<X6. Moreover, taking the number of wavelengths of the main signal light into consideration, since the signal light power on the long wavelength side increases due to the influence of the Raman effect as the number of wavelengths increases, the pump light power on the short wavelength side needs to be increased to give the relationship X1>X2>X3 and X4>X5>X6. In such a database, compared to the aforementioned database in the conventional technology, respective data of the pump light power ratio are collected together for each type of the transmission line (loss wavelength characteristic) and it is not necessary to segmentalize the loss of the transmission line (span loss) to set the data. Therefore it can be made much smaller. Consequently the database can be built easily, and a pump light power ratio suitable for the actual system requirements can be quickly selected from the database.

In Table 1, an example is shown in which the pump light power ratio is classified in three stages according to the number of wavelengths of the main signal light. However the classification scheme for the pump light power ratio is not limited to this example.

By optimization of the pump light power as described above, the output wavelength characteristic of the main signal light after the distributed Raman amplification can be set to the target output wavelength characteristic, automatically corresponding to the type of the transmission line (loss wavelength characteristic) actually connected, and automatically corresponding to a change of the Raman effect according to the number of wavelengths of the main signal light.

Here, a favorable additional function of the arithmetic circuit 51 associated with a series of processing for specifying the aforementioned type of the transmission line will be described.

In the arithmetic circuit 51, the transmission line loss in a wavelength (for example, 1.55 μm) in the main signal band can be calculated by using the calculated loss wavelength characteristic of the transmission line. Alternatively, the transmission line loss calculated for a wavelength of the pump light or the like can be converted to a transmission line loss in a wavelength in the main signal band, by preparing a conversion value for each type of the transmission line and using the conversion value corresponding to the specified type of the transmission line. Moreover, since standard loss data per unit length in a specific wavelength is known for the transmission line by specifying the type of the transmission line, the transmission line loss calculated by using a monitored value of the transmission line input/output powers for the pump light and the like can be divided by a loss per unit length corresponding to the wavelength, to thereby calculate the length of the transmission line. Therefore, if the specified type of the transmission line, the transmission line loss at a wavelength in the main signal band, and the length of the transmission line is output as transmission line information to the outside of the optical transmission device 2B from the arithmetic circuit 51, the transmission line information can be used by various devices on the system. For example, in the optical transmission system in which the capacity is increased by increasing a bit rate of the main signal light, a variable dispersion compensator is applied because design for dispersion becomes severe. In such a system, if the above transmission line information is transmitted from the arithmetic circuit 51 in the optical transmission device 2B to the variable dispersion compensator, a preferable dispersion amount of the variable dispersion compensator can be determined at a high speed.

Moreover, in the arithmetic circuit 51, at the time of specifying the type of the transmission line, if the type of the transmission line having the loss wavelength characteristic corresponding to the calculated loss wavelength characteristic is not present in the database, there is a high possibility that an abnormality such as extreme bending or fracture of the transmission line has occurred. In such a case, the abnormality of the transmission line can be detected to give off an alarm to the outside. By providing such an alarm giving function to the arithmetic circuit 51, a system having high reliability that can detect an abnormality in the transmission line at an early stage with a simple configuration can be realized.

Figure 7:
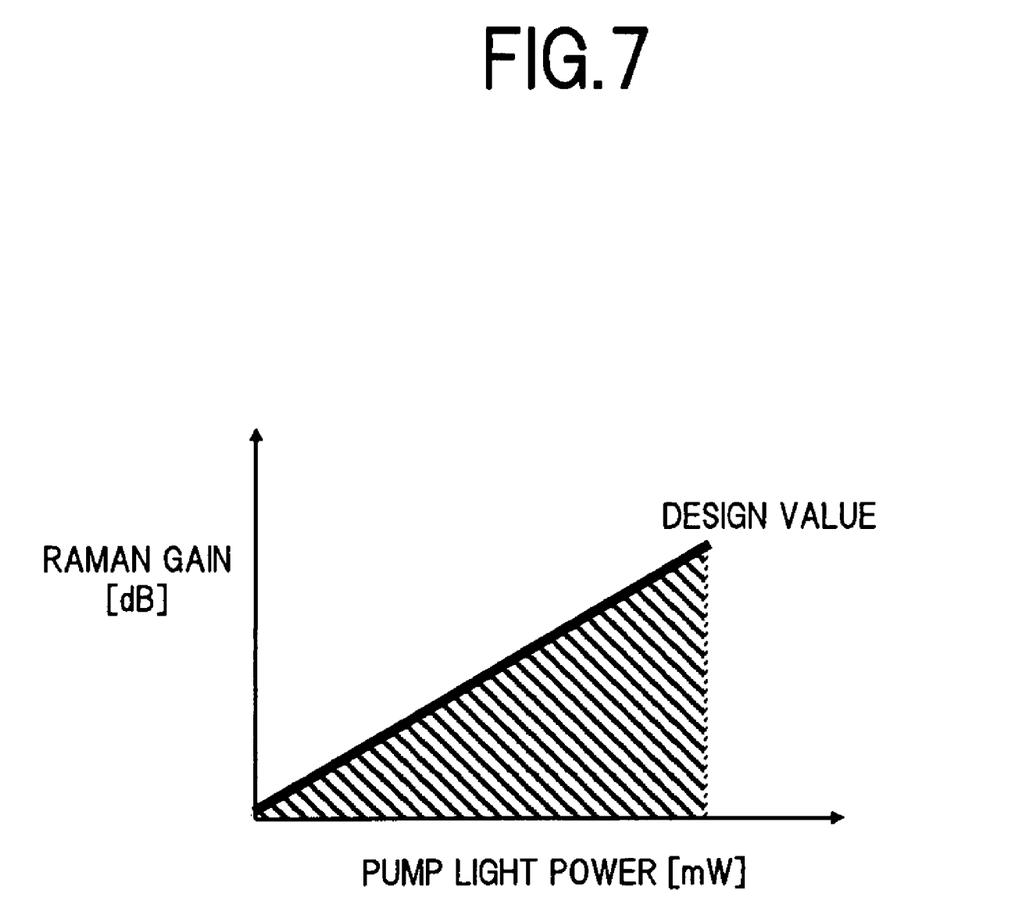
FIG. 7 is a diagram for explaining a function of detecting an abnormality due to a decrease in Raman gain.

Furthermore in the arithmetic circuit 51, a relationship (design value) between the pump light power and the Raman gain, for example, as illustrated by the solid line in FIG. 7, is obtained to compare the design value with the Raman gain (detection value of the gain reference light receiver 32) with respect to the pump light power (the monitored value of the pump light input monitor 22) actually input to the transmission line, and when the actual Raman gain is smaller than the design value (corresponding to the shaded portion in FIG. 7), occurrence of an abnormality can be detected to give off an alarm to the outside. Moreover, by outputting information relating to a difference between the design value and the actual Raman gain to the outside instead of the alarm or together with the alarm, the information can be notified to a system management section or other devices on the system such as an optical amplifier. As a result a system having high reliability that can detect an abnormal case in which some loss medium is present on the transmission line, at an early stage can be realized.

The transmission line information and the alarm output from the arithmetic circuit 51 to the outside can be carried on the OSC light transmitted from the own station and transmitted to other devices in the system.

Next is a description of a more specific configuration example of the above embodiment.

Figure 8:
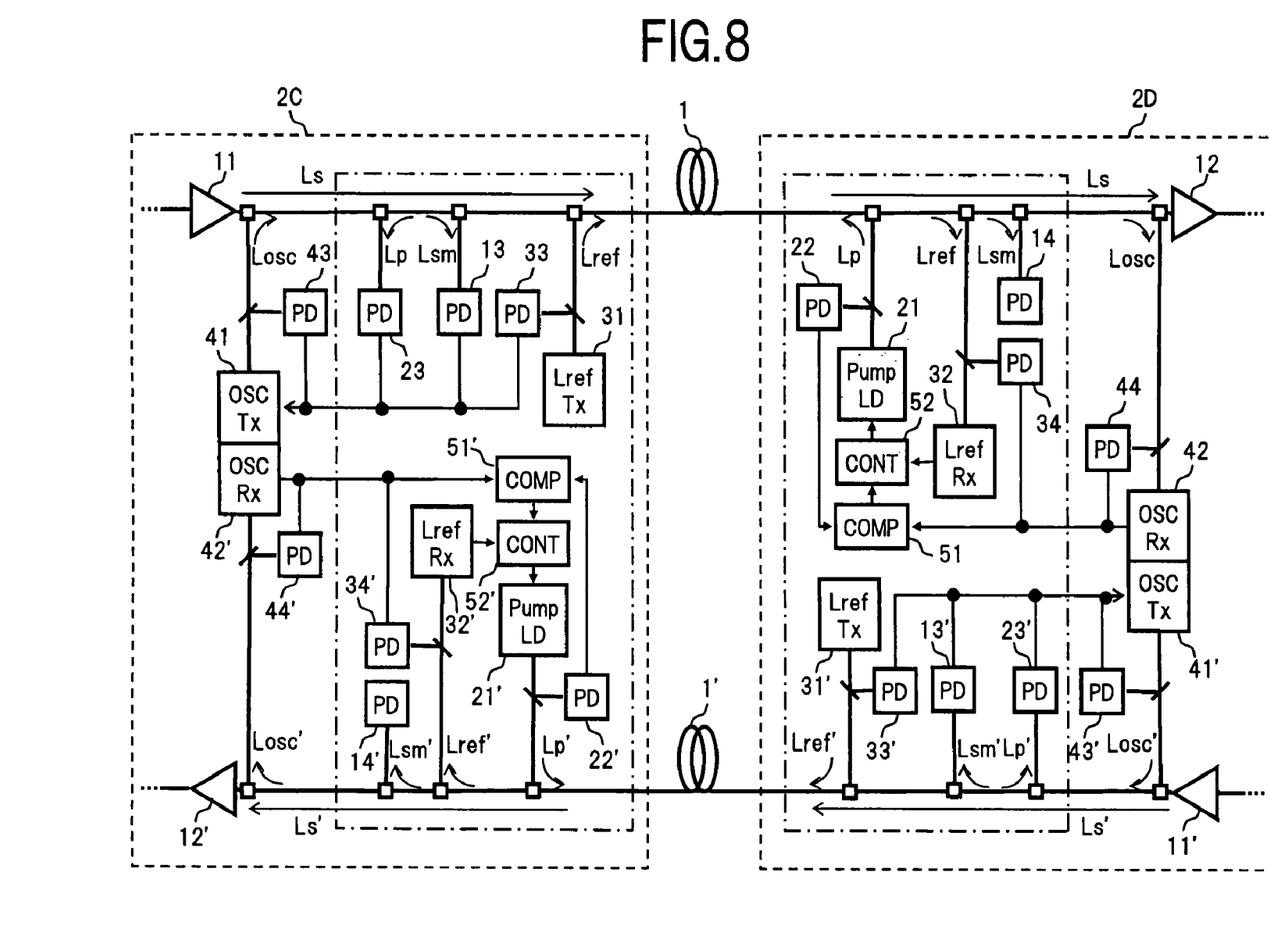
FIG. 8 is a block diagram showing a more specific configuration example related to the embodiment of FIG. 1.

FIG. 8 shows a configuration example in which the configuration of one repeater section of the aforementioned WDM optical transmission system illustrated in FIG. 1 is applied to a WDM optical transmission system having a pair of transmission lines 1 and 1' corresponding to an uplink and a downlink. Specifically, an optical transmission device 2C includes, as a configuration on the transmission side corresponding to the uplink illustrated on the upper side of FIG. 8, an optical amplifier 11, a main signal light input monitor (PD) 13, a pump light output monitor (PD) 23, a gain reference light transmitter (Lreffx) 31, a gain reference light input monitor (PD) 33, an OSC transmitter (OSCTx) 41, and an OSC input monitor (PD) 43. Moreover, the optical transmission device 2C includes, as a configuration on the reception side corresponding to the downlink illustrated on the lower side of FIG. 8, an optical amplifier 12', a main signal light output monitor (PD) 14', a Raman pump light source (PumpLD) 21', a pump light input monitor (PD) 22', a gain reference light receiver (LrefRx) 32', a gain reference light output monitor (PD) 34', an OSC receiver (OSCRx) 42', an OSC output monitor (PD) 44', an arithmetic circuit (COMP) 51', and a pump light control circuit (CONT) 52'. Furthermore, an optical transmission device 2D has a configuration in which the transmission side and the reception side of the uplink and the downlink in the aforementioned optical transmission device 2C are replaced with each other. The portions enclosed by the one-dot chain line in FIG. 8 indicate distributed Raman amplification units in the respective optical transmission devices 2C and 2D.

Also for a system in which the WDM signal light is transmitted in both directions via the pair of transmission lines 1 and 1', while being subjected to distributed Raman amplification, as in the above described embodiment, the input/output powers of the pump lights Lp and Lp', the gain reference lights Lref and Lref', and the OSC lights Losc and Losc' corresponding to the uplink and the downlink with respect to the transmission lines 1 and 1' are monitored to obtain the loss wavelength characteristic by calculating the transmission line loss in each wavelength, and the type of the respective transmission lines 1 and 1' is specified to perform the pump light power control and the like. As a result, the output wavelength characteristics of the respective main signal lights Ls and Ls' after Raman amplification can be set to the target output wavelength characteristics, automatically corresponding to a change of the system requirements in the uplink and the downlink.

What is claimed is:

1. A wavelength division multiplexing optical transmission system provided with a first optical device connected to one end of a transmission line, for transmitting wavelength division multiplexing signal light to the transmission line, and a second optical device connected to an other end of the transmission line for receiving wavelength division multiplexing signal light that has propagated through the transmission line and been subjected to distributed Raman amplification, wherein
    the wavelength division multiplexing optical transmission system comprising:
    a monitor that monitors transmission line input power for a plurality of lights which are transmitted from one of the first and second optical devices and transmission line output power for the plurality of lights which are received by the other optical device, the plurality of lights having different wavelengths than the wavelength division multiplexing signal light being transferred between the first and the second optical devices via the transmission line;
    a calculating circuit that calculates a transmission line loss in each wavelength corresponding to the plurality of lights, by using values of transmission line input power and transmission line output power for the plurality of lights monitored by the monitor, and specifies a type of the transmission line based on a loss wavelength characteristic that can be estimated from the calculation result;
    a pump light source that supplies to the transmission line, pump light for performing distributed Raman amplification on the wavelength division multiplexing signal light propagating through the transmission line; and
    a controller that controls the pump light source so that an output wavelength characteristic of wavelength division multiplexing signal light that has been subjected to distributed Raman amplification, and which is output from an other end of the transmission line, becomes a target output wavelength characteristic, corresponding to the type of the transmission line specified by the calculating circuit.

2. A wavelength division multiplexing optical transmission system according to claim 1, wherein the plurality of lights monitored by the monitor include pump light output from the pump light source.

3. A wavelength division multiplexing optical transmission system according to claim 2, wherein
    the monitor monitors gain reference light having a wavelength that is different than a wavelength of the pump light outside a wavelength band of the wavelength division multiplexing signal light, the gain reference light being transferred between the first and the second optical devices via the transmission line, and
    the controller controls the pump light source so that a Raman gain becomes constant based on the gain reference light.

4. A wavelength division multiplexing optical transmission system according to claim 3, wherein the plurality of lights monitored by the monitor includes the gain reference light.

5. A wavelength division multiplexing optical transmission system according to claim 4, wherein
    the first optical device comprises:
    a pump light output monitor that monitors transmission line output power of the pump light output from one end of the transmission line;
    a gain reference light transmitter that generates the gain reference light, and transmits the gain reference light to one end of the transmission line; and
    a gain reference light input monitor that monitors transmission line input power of the gain reference light transmitted from the gain reference light transmitter,
    and the second optical device comprises:
    a pump light input monitor that monitors transmission line input power of the pump lights output from the pump light source;
    a gain reference light receiver that receives the gain reference light output from an other end of the transmission line, and detects Raman gain in the transmission line;
    a gain reference light output monitor that monitors transmission line output power of the gain reference light received by the gain reference light receiver, wherein
    the pump light source generates a plurality of the pump lights with different wavelengths, and supplies these pump lights to the transmission line,
    the calculating circuit that calculates a transmission line loss in a wavelength of the pump light, by using values monitored by the pump light input monitor and the pump light output monitor, and calculates transmission line loss in a wavelength of the gain reference light, by using values monitored by the gain reference light input monitor and the gain reference light output monitor, and specifies a type of the transmission line based on a loss wavelength characteristic that can be estimated from the calculation results, and
    the controller selects from a data base in which design values of pump light power ratios for each type of transmission line are previously determined, a pump light power ratio corresponding to a type of the transmission line specified by the arithmetic circuit, and while maintaining the selected pump light power ratio, controls a pump light total power so that a Raman gain becomes constant based on the gain reference light.

6. A wavelength division multiplexing optical transmission system according to claim 5, wherein
when the first optical device has a branching coupler that has two-to-two ports in a fiber type configuration, and is inserted on a transmission line that propagates wavelength division multiplexing signal light, and branches a part of wavelength division multiplexing signal light transmitted to one end of the transmission line, and outputs this part from one of opposing branch ports,
the pump light output monitor includes an optical detector connected to another of opposing branch ports of the branching coupler.

7. A wavelength division multiplexing optical transmission system according to claim 6, wherein
the pump light output monitor includes an optical filter between the branching coupler and the optical detector, that removes Raman noise light propagating in an opposite direction to wavelength division multiplexing signal light.

8. A wavelength division multiplexing optical transmission system according to claim 2, wherein
the monitor monitors an optical supervisory channel having a wavelength that is different than a wavelength of the pump light outside a wavelength band of the wavelength division multiplexing signal light, the optical supervisory channel being transferred between the first and the second optical devices via the transmission line, and the optical supervisory channel transmits system operation information,
and the controller controls the pump light source in accordance with a type of the transmission line specified by the calculating circuit and a number of wavelengths of wavelength division multiplexing signal light included in the system operation information, so that output wavelength characteristics of wavelength division multiplexing signal light output from an other end of the transmission line, and that has been subjected to distributed Raman amplification, become a target output wavelength characteristic.

9. A wavelength division multiplexing optical transmission system according to claim 8, wherein the plurality of lights monitored by the monitor includes the optical supervisory channel.

10. A wavelength division multiplexing optical transmission system according to claim 9, wherein
the first optical device comprises:
a pump light output monitor that monitors transmission line output power of the pump light output from one end of the transmission line;
an optical supervisory channel transmitter that generates an optical supervisory channel, and transmits the optical supervisory channel to one end of the transmission line; and
an optical supervisory channel input monitor that monitors transmission line input power of the optical supervisory channel transmitted from the optical supervisory channel transmitter,
and the second optical device comprises:
a pump light input monitor that monitors transmission line input power of the pump light output from the pump light source;
an optical supervisory channel receiver that receives the optical supervisory channel output from an other end of the transmission line, and obtains the system operation information;
an optical supervisory channel output monitor that monitors transmission line output power of the optical supervisory channel received by the optical supervisory channel receiver, wherein
the pump light source that generates a plurality of the pump lights with different wavelengths, and supplies these pump lights to the transmission line,
the calculating circuit calculates a transmission line loss in a wavelength of the pump light, by using monitor values of the pump light input monitor and the pump light output monitor, and calculates transmission line loss in a wavelength of the optical supervisory channel, by using values monitored by the optical supervisory channel input monitor and the optical supervisory channel output monitor, and specifies a type of the transmission line based on a loss wavelength characteristic that can be estimated from the calculation results, and
the controller selects from a data base in which design values of pump light power ratios for each combination of type of transmission line and number of wavelengths of wavelength division multiplexing signal light are previously determined, a pump light power ratio corresponding to a combination of types of the transmission line specified by the calculating circuit, and a number of wavelengths of wavelength division multiplexing signal light included in the system operation information obtained by the optical supervisory channel receiver, and while maintaining the selected pump light power ratio, controls a pump light total power.

11. A wavelength division multiplexing optical transmission system according to claim 10, wherein
when the first optical device has a branching coupler that has two-to-two ports in a fiber type configuration, and is inserted on a transmission line that propagates wavelength division multiplexing signal light, and branches a part of wavelength division multiplexing signal light transmitted to one end of the transmission line, and outputs this part from one of opposing branch ports,
the pump light output monitor includes an optical detector connected to another of opposing branch ports of the branching coupler.

12. A wavelength division multiplexing optical transmission system according to claim 11, wherein
the pump light output monitor includes an optical filter between the branching coupler and the optical detector, that removes Raman noise light propagating in an opposite direction to wavelength division multiplexing signal light.

13. A wavelength division multiplexing optical transmission system according to claim 1, wherein the calculating circuit calculates a transmission line loss in a wavelength band of wavelength division multiplexing signal light by using, a calculation value of transmission line loss in each wavelength of the plurality of lights, and a conversion value corresponding to a specified type of transmission line.

14. A wavelength division multiplexing optical transmission system according to claim 13, wherein
the calculating circuit calculates a length of the transmission line by using, a calculation value of transmission line loss in each wavelength of the plurality of lights, and loss data per unit length corresponding to a specified type of transmission line.

15. A wavelength division multiplexing optical transmission system according to claim 14, wherein
the calculating circuit notifies transmission line information including a type of transmission line, a transmission line loss in a wavelength band of wavelength division multiplexing signal light, and length of a transmission line, to a variable dispersion compensator in the system.

16. A wavelength division multiplexing optical transmission system according to claim 1, wherein
the calculating circuit detects an abnormality and releases an alarm, when a loss wavelength characteristic cannot be estimated from a calculation value of transmission line loss in each wavelength of the plurality of lights.

17. A wavelength division multiplexing optical transmission system according to claim 3, wherein
the calculating circuit obtains a relationship of Raman gain with respect to transmission line input power of pump light based on a specified type of transmission line, and when Raman gain based on the gain reference light with respect to transmission line input power of pump light monitored by the monitor after starting operation of wavelength division multiplexing, is less than Raman gain corresponding to the obtained relationship, detects an abnormality and releases an alarm.

18. A wavelength division multiplexing optical transmission system according to claim 3, wherein
the calculating circuit obtains a relationship of Raman gain with respect to transmission line input power of pump light based on a specified type of transmission line, and when Raman gain based on the gain reference light with respect to transmission line input power of pump light monitored by the monitor after starting operation of wavelength division multiplexing, is smaller than the Raman gain corresponding to the obtained relationship, detects an abnormality and outputs information relating to a difference in the Raman gain to an outside of the calculating circuit.

\* \* \* \* \*